United States Patent [19]

McNally

[11] 4,170,159

[45] Oct. 9, 1979

[54] LINEAR POSITIONING APPARATUS

[75] Inventor: Paul F. McNally, Gibsonia, Pa.

[73] Assignee: Contraves Goerz Corporation, Pittsburgh, Pa.

[21] Appl. No.: 866,693

[22] Filed: Jan. 3, 1978

[51] Int. Cl.² ............................................ C03B 33/02
[52] U.S. Cl. ..................................... 83/562; 83/883; 83/425.4; 83/504; 83/499; 83/508.3
[58] Field of Search ................ 83/11, 425.4, 504, 499, 83/508.3, 562

[56] References Cited

U.S. PATENT DOCUMENTS

| | | | |
|---|---|---|---|
| 3,515,020 | 6/1970 | Dryon | 83/11 |
| 3,750,513 | 8/1973 | Cromeens | 83/499 X |
| 3,834,258 | 9/1974 | Zumstein | 83/11 |
| 3,882,764 | 5/1975 | Johnson | 83/499 X |
| 3,885,483 | 5/1975 | Ikeya et al. | 83/425.4 X |

Primary Examiner—Frank T. Yost
Attorney, Agent, or Firm—Robert D. Yeager

[57] ABSTRACT

A movable carriage which is connected to a smooth actuating rod for movement therewith to a desired position where it is locked to a fixed bridge permitting the actuating rod to move with respect thereto. The movable carriage or head is clamped to the actuating rod with a continual friction force which is easily overcome by the force with which the carriage is locked to the fixed bridge. The actuating rod is movable back and forth along its longitudinal axis by manual or automatic positioning apparatus. By successive moving and locking operations for the carriage, the carriage can be moved along the entire bridge while the movement of the actuating rod is more limited. The actuating rod can be a smooth metallic rod with the carriages permanently clamped thereto with a determinable friction force, alternately the carriage can be clamped to the actuating rod until the carriage is clamped to the fixed bridge. A drive motor is used for moving the actuating rod back and forth. A manual back-up is provided for manually moving the actuating rod. When more than one carriage is utilized, adjacent carriages can be moved close together. That is, movement of the carriages is not restricted to selected zones.

16 Claims, 6 Drawing Figures

LINEAR POSITIONING APPARATUS

BACKGROUND OF THE INVENTION

1. Field of the Invention

This invention relates to positioning apparatus and more particularly to apparatus for positioning a plurality of carriages along a bridge which extends across a work surface.

2. Description of the Prior Art

Apparatus is necessary for accurately positioning a glass cutter in the path along which sheet glass is conveyed as it leaves a sheet glass manufacturing plant. The cooled glass continually leaving the plant must be cut both transversely and longitudinally to form sheets of predetermined sizes. The longitudinal cutting is normally performed by cutters supported from above the path of travel of the cooled sheet glass so as to cut or score the glass longitudinally as it moves through the cutting section. The irregular edges of the glass sheet must be cut as the sheet moves through the cutting section. At times a narrow defect which extends longitudinally through the glass sheet will be present. It is desirable to be able to move two adjacent cutters close together to cut out this defect. To minimize lost production it is desirable to be able to move a replacement cutter into position while the worn out cutter wheels are replaced. For these reasons positioning apparatus wherein the cutter heads are limited to movement within fixed non-overlapping zones are disadvantageous. Further as a glass sheet shifts or moves on the work surface it is often desirable to simultaneously move all cutter heads to compensate for the shifted glass sheet.

Glass cutting apparatus which provide for a bridge extending over a work surface and having positionable cutter heads attached to the bridge are well known. Such apparatus is discussed in U.S. Pat. Nos. 3,470,776 and 3,742,793. Apparatus for automatic positioning of the cutter heads is also known and is exemplified by U.S. Pat. No. 3,834,258. A disadvantage with the apparatus as shown in U.S. Pat. No. 3,834,258 is that individual cutting heads are provided to operate in individual zones and adjacent cutting heads operate only in neighboring non-overlapping zones. This presents a problem when narrow faults extend longitudinally through a glass sheet where it is desirable to have cutter heads which can be operated relatively close together in the same zone for cutting out the fault. Another disadvantage with the apparatus disclosed in U.S. Pat. No. 3,834,258 is that the cutter heads must be returned to fixed home position before being repositioned, and an entire pattern set on several cutter heads cannot be shifted without returning all the cutter heads to the home position.

SUMMARY OF THE INVENTION

Positioning apparatus is disclosed which utilizes a carriage movable along a fixed elongated bridge which is positioned above a work surface. A lock is provided for locking the carriage to the fixed bridge at a desired position. A smooth rod extends parallel to the bridge and is movable along its longitudinal axis in both directions. The movable carriage is clamped to the smooth rod with a determinable continuous friction force. When the movable carriage is not locked to the elongated bridge or is not engaging a stop, it moves unitarily with the smooth support rod. However, when the carriage is locked to the bridge or engaging a stop, the smooth rod moves relative to the carriage. Actuating means is provided for moving the smooth rod along its longitudinal axis. The required movement of the actuating means need be only a fraction of the distance which the carriage can move along the bridge. By repeated moving and locking operations the carriage can move a distance along the bridge which is much greater than movement of the actuating means. A complete manual backup is provided for accurate movement of the actuator means. The actuating means can be and normally is moved by a controlled motor.

In a normal situation more than one carriage is supported from the elongated bridge. The plurality of carriages can be moved close to the adjacent or neighboring carriages. The separation between the cutter heads is limited only by the construction of the carriage. This is an important feature for cutting small faults out of a glass sheet. The cutter heads are also not limited to travel only within non-overlapping fixed zones. This permits adjacent cutter heads to move into a desired cutting position when the cutter wheel must be replaced. Cutter wheels can thus be replaced without a loss of production time. The disclosed apparatus also permits all of the cutter heads to be simultaneously shifted to a different position without returning the cutter heads to the home position.

The carriages which are slidably supported from the bridge are connected to the positioning rod by a continual friction force. Spring steel members connected to the carriage, having brass wear plates attached to the end thereof, are utilized for engaging the smooth rod. The brass wear pads are biased by the spring steel members to continually engage the smooth rod.

The force with which the carriage frictionally engages the smooth rod depends on the force supplied by the spring steel members and the coefficient of friction between the wear pad and the smooth rod. This force, while being strong enough the assure that the carriage will move accurately with the smooth positioning rod, is small enough so that the carriage does not move when locked to the bridge. This is, the locking force with which the carriage engages the bridge is much greater than the frictional force with which the carriage continually engages the positioning rod. When the carriage engages the bridge, the positioning rod is movable relative to the carriage. Positioning of the carriages is computer controlled. The positions of all carriages are stored and a carriage can be moved to a new position without returning to a fixed home position. This permits individual carriages to be quickly and easily shifted and also permits an entire cutting pattern set up to be shifted as a unit.

The carriage positioning is accomplished by a CSR System 1160 Absolute Positioning System utilized in conjunction with a highly efficient two state motor controller and permanent magnet servo motor. Absolute position feedback is provided by brushless resolvers utilized in a two speed (coarse/fine) arrangement.

The mechanical bridge utilizes a precision ground ball screw drive with a 0.2"/revolution lead. The ball screw drive allows machine tool tolerance to be easily achieved without imposing undue constraints on the mechanical alignment as would be the case with a rack and pinion type drive. The overall design of the system is simple yet extremely flexible allowing additional cutting heads to be easily added.

It is an object of this invention to teach positioning apparatus wherein a plurality of glass cutter heads can be shifted as a unit to a new position without returning each cutter head to a home position.

It is an object of this invention to teach glass cutting apparatus utilizing a bridge for supporting a plurality of movable cutter heads wherein adjacent cutter heads are operable in overlapping zones.

It is a further object of this invention to teach positioning apparatus for a glass cutter wherein each glass cutter can be moved to a new position without returning to a fixed home position.

It is yet another object of this invention to teach a bridge having a plurality of glass cutter heads connected thereto wherein the cutter heads can be automatically positioned to a desired position or manually positioned to a desired position.

BRIEF DESCRIPTION OF THE DRAWINGS

For a better understanding of the invention reference may be had to the preferred embodiments exemplary of the invention shown in the accompanying drawings in which:

FIG. 6 is an enlarged view of a portion of a carriage shown in FIG. 1.

DESCRIPTION OF THE PREFERRED EMBODIMENTS

Figure 3:
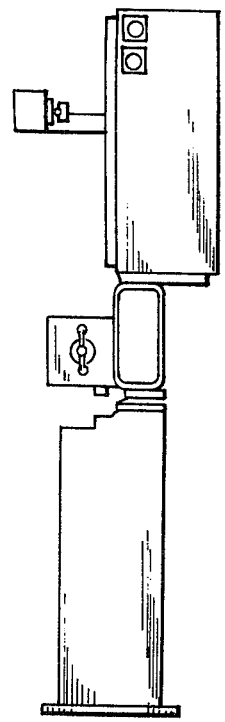
FIG. 3 is a right end view of the glass cutter shown in FIG. 1.
Figure 5:
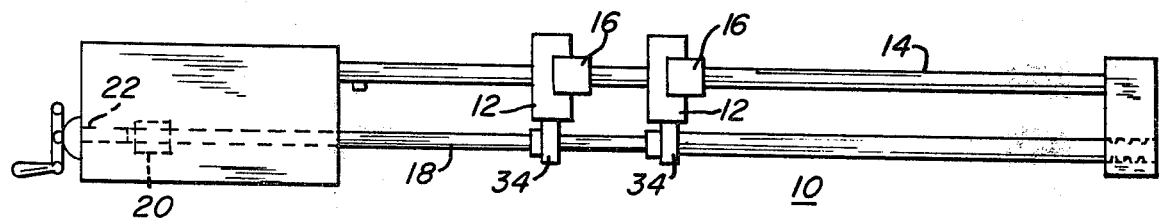
FIG. 5 is a top view of the glass cutter bridge shown in FIG. 4.
Figure 4:
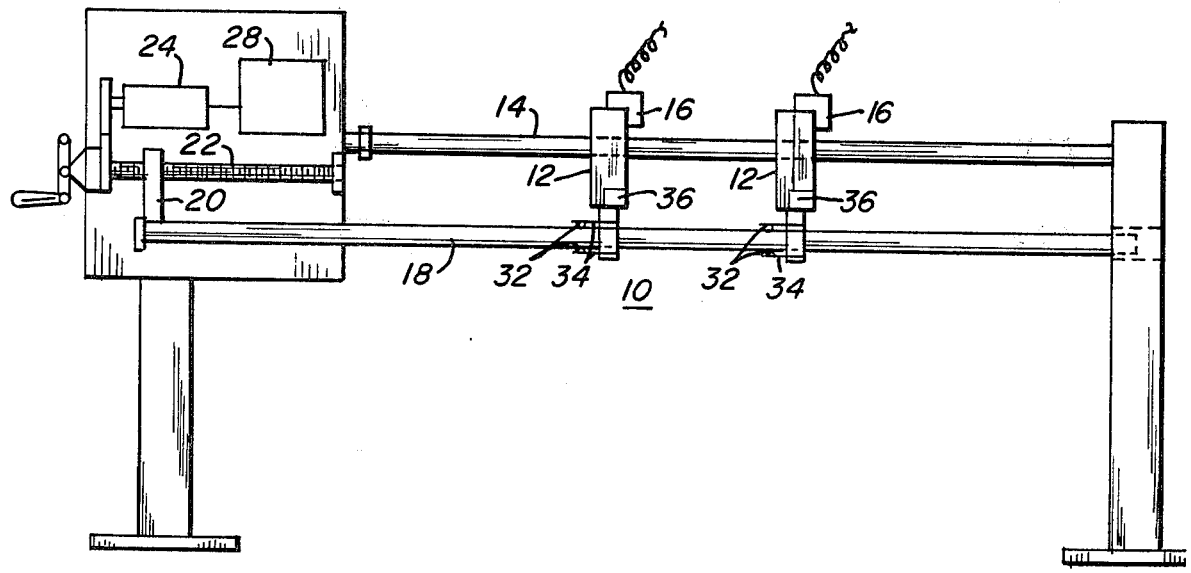
FIG. 4 is a front diagramatic representation of glass cutter apparatus constructed according to the teaching of the present invention.

Referring now to the drawings and FIGS. 3 and 4 in particular there is shown a diagramatic representation of glass cutting apparatus 10 constructed according to the teaching of the present invention. Glass cutting apparatus 10 comprises a plurality of carriages 12 which are slidably supported by a fixed, elongated bridging member 14. Locking devices 16 are provided which when activated securely lock carriage 12 to bridge member 14. When a locking device 16 is activated, carriage 12 cannot be moved relative to bridge 14. A positioning rod 18 extends through openings formed in carriage 12. Positioning rod 18 is movable forward or backward along its longitudinal axis. Positioning rod 18 has connected to one end a member 20 which has an internal threaded portion formed therethrough. The internal threaded portion is engaged by threaded member 22. Member 20 is securely connected to positioning rod 18 for unitary movement therewith. Threaded rod 22, as it turns, move positioning rod 18. Threaded rod 22 can be driven either by motor 24 or by manual positioning crank 26. Motor 24 is controlled by electronic controls 28. Carriges 12 engage positioning rod 18 with a determinable frictional force.

Friction engaging members 32, which can be brass wear pads, are secured to carriage 12 and engage rod 18. Pads 32 are mounted at the ends of spring steel members 34. The pair of spring steel members 34 attached to each carriage 12 on opposite sides of rod 18 are biased together forcing wear pads 32 into frictional engagement with rod 18. Carriage 12 has secured thereto a cutter wheel portion 36 which is movable downward into engagement with a glass sheet as it passes beneath carriage 12. Wear pads 32 engage positioning rod 18 and provide a continual friction force for holding carriages 12 to rod 18. The frictional force with which carriage 12 is held to rod 18 is large enough to ensure that carriage 12 moves unitarily with rod 18 when locking means 16 is not activated.

If all of the locking devices 16 are unlocked all of the carriages 12 will move as a unit with positioning rod 18. Positioning rod 18 can move either forward or backward along its longitudinal axis as threaded rod 22 rotates. The distance which positioning rod 18 can move is determined by the length of threaded rod 22. Carriages 12 can move a much greater distance than positioning rod 18. By successive moving and locking operations, carriage 12 can be moved entirely along bridge 14. Adjacent carriages 12 can be moved into close proximity with one another. Separation between the cutting devices 36, held by carriages 12, is only limited by the physical construction of the carriages 12. That is movement of carriage 12 is not restricted to certain non-overlapping zones across positioning apparatus 10 as in some prior art positioning systems, such as shown in U.S. Pat. No. 3,834,258.

Referring now to FIGS. 1, 2, 3 and 6 there is shown an actual automatic glass cutter 10 which is constructed according to the teaching of the present invention. A fixed elongated bridge 11 is constructed to extend across a movable glass sheet. Bridge 11 is approximately 120 inches long. Bridge 11 is supported from the floor by structural support members 50. A pair of fixed elongated guide rods 14 slidably support a plurality of carriages 12. A positioning or actuating rod 18 is provided for positioning carriage 12. An oil supply line 52 and an air supply line 54 are supported from bridge 11. The air supply is used for operating various air solenoids or cylinders supported on carriage 12. Oil supply 52 is utilized for proper lubrication of the glass cutter heads. A control panel 25 is provided on one end of bridge 11 for controlling movement of positioning rod 14. Control panel 25 receives an input from a control console. Air solenoids are utilized for locking carriage 12 to support rods 14 when desired. Air solenoids are also utilized for lowering the glass cutter wheels. If desired, various reference stops can be provided on bridge 11 to provide positions to which the carriages 12 can return when desired.

Figure 1:
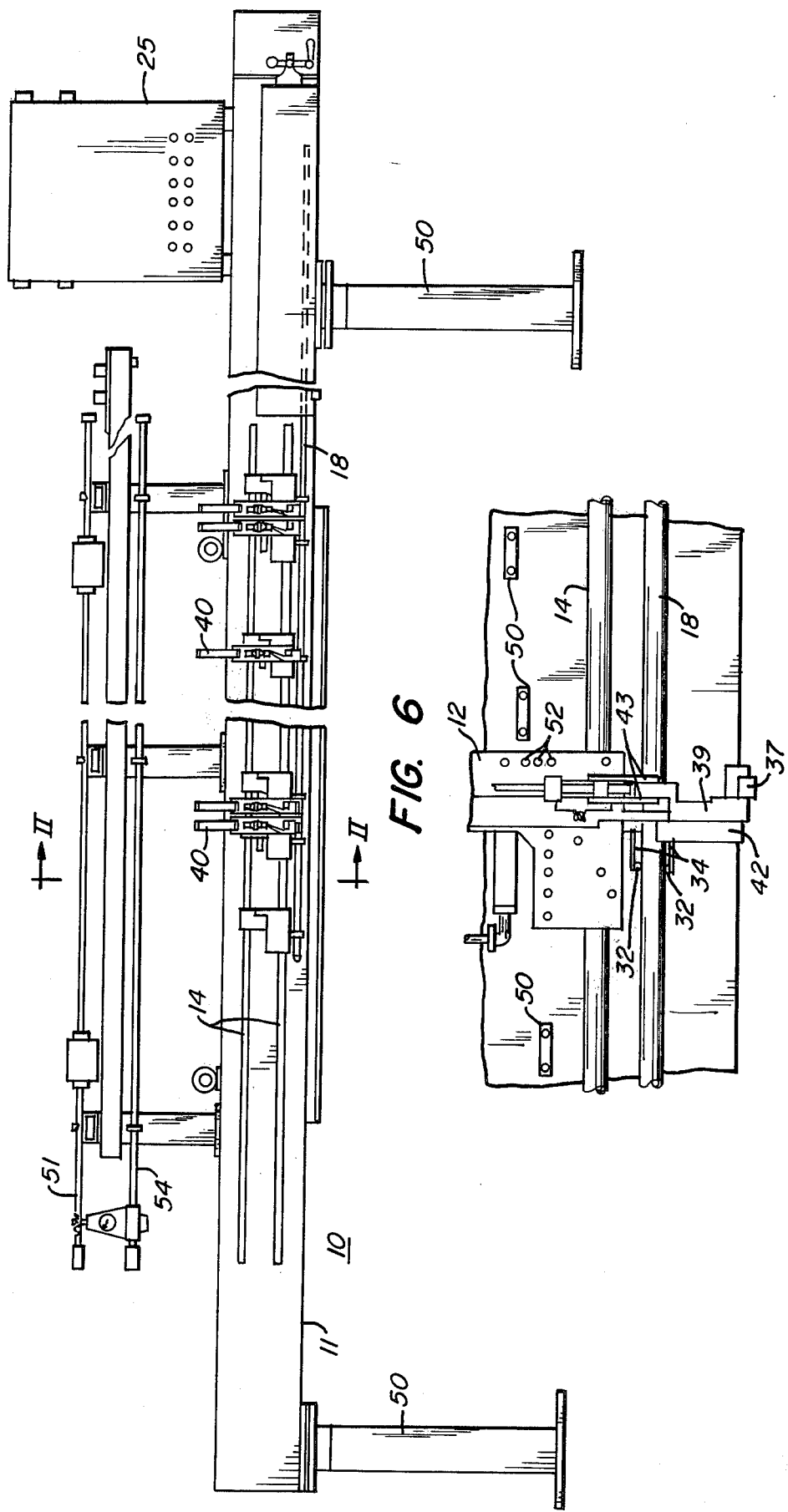
FIG. 1 is a front view of a glass cutter bridge constructed according to the teaching of the present invention.
Figure 2:
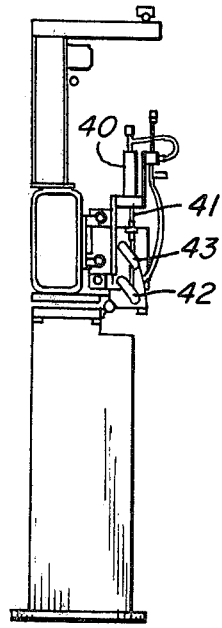
FIG. 2 is a view in FIG. 1 along the lines II—II.

Referring now to FIGS. 2 and 6 where is shown in more detail a view of carriage 12. A glass cutter 37 is movable between a raised and lowered position by air cylinder 40 through rod 41. Cutter 37 is attached to member 39 which is connected to links 42 and 43 to carriage 12. The operating rod 41 of air cylinder 40 is connected intermediate the ends of links 43 for raising and lowering cutter 37.

A plurality of fixed stops 50 are attached to bridge 11. The vertical position of stops 50 can be varied. Mating stops are also provided on carriage 12. An adjustment bolt 52 is provided on carriage 12 for raising or lowering the position of the mating stops atached to carriage 12. Carriage 12 can thus be set to engage some stops 50 while passing over other stops 50. The disclosed apparatus can thus use fixed stops and still have cutters which operate in overlapping zones. When locking device 16 is deactivated carriage 12 can move until an appropriate stop 50 is engaged. When all locking devices 16 are deactivated all carriages 12 will move in unison. This permits a set cutting pattern to be easily shifted to accommodate a shift in the glass sheet being cut.

The disclosed positioning system has significant advantages over prior art glass cutting positioning systems. Some of the advantages are: (1) individual cutting heads can be operated in the same area or zone as neighboring heads; (2) any head can be moved individually without returning to a fixed home position; (3) heads can be moved the entire length of the bridge if desired; (4) an entire pattern, which is set up, can be shifted without returning to a home position; (5) a complete manual back-up is provided for manually positioning cutter heads; (6) the required movement of the actuator rod is only a fraction of the distance the carriage can move along the bridge, and, (7) the carriage can be set to respond to some stops 50 while passing over others.

In an exemplary glass cutting system the mechanical system consists of a single heavy-duty bridge structure with the capability of having a cutting head positioning assembly mounted to each side. The system is designed to allow up to 19 heads to be easily added on each side without major mechanical or electrical modifications. The head positioning system utilizes a CSR System 1160 Absolute Positioning System directly driving a precision ground ball screw assembly with 40" of overall travel. Accuracy of the screw and positioning system is better than ±0.003" over the 40" travel. The ball screw assembly is utilized to drive a rod mechanism which also moves 40" but traverses fully across the full length of the bridge. Each cutting head is then driven by the rod over its assigned range of travel.

The sequence of positioning the cutter heads would be as follows:

(1) The rod is driven to the initial zero position by the position servo. In doing so, each head is also moved to the zero point of its range of travel.

(2) The position servo then travels to the first position, where an available head is to be placed. The selected head is then decoupled from the rod and clamped rigidly to a guide rail. The head will maintain its position until the rod is again moved to the initial zero position.

(3) The cycle continues until all the heads have been positioned along the bridge guide rail.

Total positioning time for the system with 19 heads would be less than 15 seconds.

There are two mechanical adjustments which are provided to allow manual head positioning.

(1) Each cutting wheel assembly is provided with a Vernier adjustment to allow ±1/32" correction.

(2) An overall manular backup is provided which allows the drive screw to be manually positioned and the heads to be clamped as required for manually setting a cutting program.

A complete system will include an operator control console. The control panel allows entry of program dimensions which are held in memory for recall when running a particular program. A CRT readout screen provides a convenient readout of a stored program and machine status. The display format for a typical program would be as follows:

| PROGRAM XX | | | | | | | |
|---|---|---|---|---|---|---|---|
| Cut Size | 4" 3/128 | 12" 3/128 | 12" 64/128 | 18" 64/128 | 18" 64/128 | 18" | 24" 96/128 |
| Head Dimension | 24" | 36" 3/128 | 48" 6/128 | 66" 70/128 | 85" 6/128 | 103" 6/128 | 127" 102/128 |
| Active Head Used | 1 | 2 | 3 | 4 | 5 | 6 | 7 |
| Line Shift | 9.1" | | | | | | |
| Bridge Active | 2 | | | | | | |
| Program Active | 13 | | | | | | |

Individual head enable/disable controls are provided which disables (raises) the cutter head selected and provides a signal to the computer which would then use another available head to run a particular program. This feature is used primarily to allow a cutting wheel change without disrupting the glass scoring operation. In this case, the program would be transferred to the other bridge side while the repair was being accomplished. This feature allows maintenance to be performed with virtually no glass loss. In addition, utilizing two bridges also allows a change from one program to another to be accomplished with a minimum of scrap.

In the event that a disable head prevents a program to be accomplished, a readout is provides which lists the "out of service" head preventing the program and also alerts the operator that the program cannot be run.

What is claimed is:

1. Positioning apparatus comprising:
    a movable carriage;
    a smooth rod supported for movement in both directions along its longitudinal axis;
    friction clamping means for clamping said carriage to said smooth rod with a determinable friction force;
    a fixed elongated bridge extending parallel to said smooth rod supporting said carriage;
    locking means for locking said carriage to said elongated bridge; and,
    actuating means for moving said smooth rod in a selected direction along its longitudinal axis with said carriage when said locking means is unlocked and for moving said smooth rod in a selected direction along its longitudinal axis relative to said carriage when said locking means is locked.

2. Positioning apparatus as claimed in claim 1 wherein:
    said movable carriage can move a selected distance along said bridge; and,
    said actuating means can move only a fraction of the selected distance which said carriage can move.

3. Positioning apparatus as claimed in claim 1 comprising:
    feed back means connected for controlling said actuator to position said carriage at a selected position.

4. Positioning apparatus as claimed in claim 3 comprising:
    a home reference position against which said carriage can move to provide a reference for initial positioning.

5. Positioning apparatus as claimed in claim 4 comprising:

manual back up means for manually moving said smooth rod to position said movable carriage.

6. Positioning apparatus comprising:

an elongated bridge;

a plurality of carriages supported by and movable with respect to said elongated bridge;

carriage securing means for rigidly securing selected carriages to said elongated bridge when activated;

an elongated actuating rod, extending parallel to said elongated bridge, having said plurality of carriages slidably connected thereto and being movable along its longitudinal axis;

clamping means connected to each carriage for clamping the associated carriage to said elongated actuating rod with a continual determinable force; and, means for moving said elongated actuating rod in both directions along its longitudinal axis.

7. Positioning apparatus as claimed in claim 6 comprising:

a plurality of reference stops disposed on said bridge;

adjustable engaging means disposed on each carriage which can be set to engage some reference stops while passing others.

8. Positioning apparatus as claimed in claim 6 wherein said clamping means comprises:

a pair of spring steel members connected to said carriage and having a wear plate attached to their free ends and being disposed so that the wear plate is forced into engagement with said actuating rod.

9. Positioning apparatus as claimed in claim 8 comprising:

manual positioning means for allowing manual positioning of said elongated actuating rod to thereby position said carriages at a desired position.

10. Positioning apparatus as claimed in claim 7 wherein:

all of said plurality of carriages moves with said elongated actuating rod when said carriage securing means is not activated.

11. Positioning apparatus as claimed in claim 7 wherein:

said elongated bridge includes a section wherein any one of said plurality of carriages can be moved.

12. Positioning apparatus comprising:

a work bed;

a bridge extending across said work bed;

a plurality of heads slidably supported from said bridge;

automatic positioning means for automatically positioning said heads at selected positions on said bridge;

said bridge and said heads constructed so that for any position of a head the adjacent heads can be moved into close proxmity thereto; and, said automatic positioning means comprises, a smooth rod movable along its longitudinal axis having said plurality of heads clamped thereto with a determinable friction force, locking means for locking selected heads to said bridge with a force greater than the friction force, and, means for moving said smooth rod along its longitudinal axis.

13. Positioning apparatus as claimed in claim 12 comprising:

manual positioning means for manually positioning said heads at a selected position.

14. Positioning apparatus as claimed in claim 12 comprising:

a plurality of stops, some of which are vertically spaced apart, disposed along said bridge;

stop engaging means disposed on each head being adjustable so that the associated head can engage some of said plurality of stops and can pass over other of said plurality of stops.

15. Positioning apparatus comprising:

an elongated bridge extending across a work surface;

a plurality of carriages supported by and movable along said elongated bridge;

carriage locking means disposed on each carriage for locking the carriage to said elongated bridge when activated;

an actuating rod which is movable along its longitudinal axis, extending parallel to said elongated bridge, and having said plurality of carriages slidably connected thereto;

means for moving said actuating rod along its longitudinal axis;

clamping means connected to each carriage for clamping the associated carriage to said actuating rod for movement with said actuating rod along its longitudinal axis;

a plurality of fixed stops secured to said elongated bridge some of which are vertically spaced apart; and, a plurality of stop engaging means attached to said carriage, each adjustable between a raised position where it can pass over said fixed stops and a lowered position where it can engage a fixed stop and limit movement of the associated carriage along said elongated bridge.

16. Positioning apparatus as claimed in claim 15 wherein said clamping means comprises:

a pair of spring steel members connected to said carriage and biased toward said actuating rod; and, a wear plate connected to the free end of said spring steel member engaging said actuating rod.

* * * * *